(12) United States Patent  (10) Patent No.: US 7,905,139 B2
Lull  (45) Date of Patent: Mar. 15, 2011

(54) MASS FLOW CONTROLLER WITH IMPROVED DYNAMIC

(75) Inventor: John Michael Lull, Fullerton, CA (US)

(73) Assignee: Brooks Instrument, LLC, Hatfield, PA (US)

( * ) Notice: Subject to any disclaimer, the term of this patent is extended or adjusted under 35 U.S.C. 154(b) by 282 days.

(21) Appl. No.: 12/197,888

(22) Filed: Aug. 25, 2008

(65) Prior Publication Data

US 2010/0049461 A1  Feb. 25, 2010

(51) Int. Cl.
G01F 1/68 (2006.01)
(52) U.S. Cl. ...................................... 73/202.5
(58) Field of Classification Search .................. 73/861; 702/100; 137/12, 487.5
See application file for complete search history.

(56) References Cited

U.S. PATENT DOCUMENTS

| | | | |
|---|---|---|---|
| 6,155,283 A | 12/2000 | Hansen et al. | |
| 6,158,679 A | 12/2000 | Ohmi et al. | |
| 6,178,995 B1 | 1/2001 | Ohmi et al. | |
| 6,216,726 B1 | 4/2001 | Brown et al. | |
| 6,217,506 B1 | 4/2001 | Phillips et al. | |
| 6,289,923 B1 | 9/2001 | Ohmi et al. | |
| 6,302,130 B1 | 10/2001 | Ohmi et al. | |
| 6,314,992 B1 | 11/2001 | Ohmi et al. | |
| 6,343,617 B1 | 2/2002 | Tinsley et al. | |
| 6,389,364 B1 | 5/2002 | Vyers | |
| 6,404,612 B1 | 6/2002 | Pattantyus | |
| 6,845,659 B2 | 1/2005 | Lull | |
| 7,107,834 B2 | 9/2006 | Meneghini et al. | |
| 7,272,512 B2 | 9/2007 | Wang et al. | |
| 7,273,063 B2 * | 9/2007 | Lull et al. .......................... 137/12 |
| 7,380,564 B2 | 6/2008 | Lull et al. | |
| 2003/0234047 A1* | 12/2003 | Shajii et al. ................. 137/487.5 |

FOREIGN PATENT DOCUMENTS

| | | |
|---|---|---|
| EP | 0110325 | 11/1983 |
| EP | 0281947 | 3/1988 |
| EP | 0834723 | 4/1998 |
| EP | 0890828 | 7/1998 |

* cited by examiner

Primary Examiner — Jewel Thompson
(74) Attorney, Agent, or Firm — SNR Denton US LLP (57) ABSTRACT

A system and method of compensating for pressure variations in a flow controller entails the use of the compressibility of the gas being controlled to provide a more accurate measurement of the flow.

38 Claims, 6 Drawing Sheets

MASS FLOW CONTROLLER WITH IMPROVED DYNAMIC

TECHNICAL FIELD OF THE INVENTION

The present invention relates generally to methods and systems for determining the mass flow rate of a fluid, and more particularly to the operation of mass flow controllers.

BACKGROUND OF THE INVENTION

Many industrial processes require precise control of various process fluids. For example, in the pharmaceutical and semiconductor industries, mass flow controllers are used to precisely measure and control the amount of a process fluid that is introduced to a process tool. A fluid can be any type of matter in any state that is capable of flow such as liquids, gases, and slurries, and comprising any combination of matter or substance to which controlled flow may be of interest.

Conventional mass flow controllers (MFCs) generally include four main portions: a flow meter, a control valve, a valve actuator, and a controller. The flow meter measures the mass flow rate of a fluid in a flow path and provides an electrical signal indicative of that flow rate. Typically, the flow meter may include a mass flow sensor and a bypass. The mass flow sensor measures the mass flow rate of fluid in a sensor conduit that is fluidly coupled to the bypass. The mass flow rate of fluid in the sensor conduit is related to the mass flow rate of fluid flowing in the bypass, with the sum of the two being the total flow rate through the flow path controlled by the mass flow controller.

Figure 1:
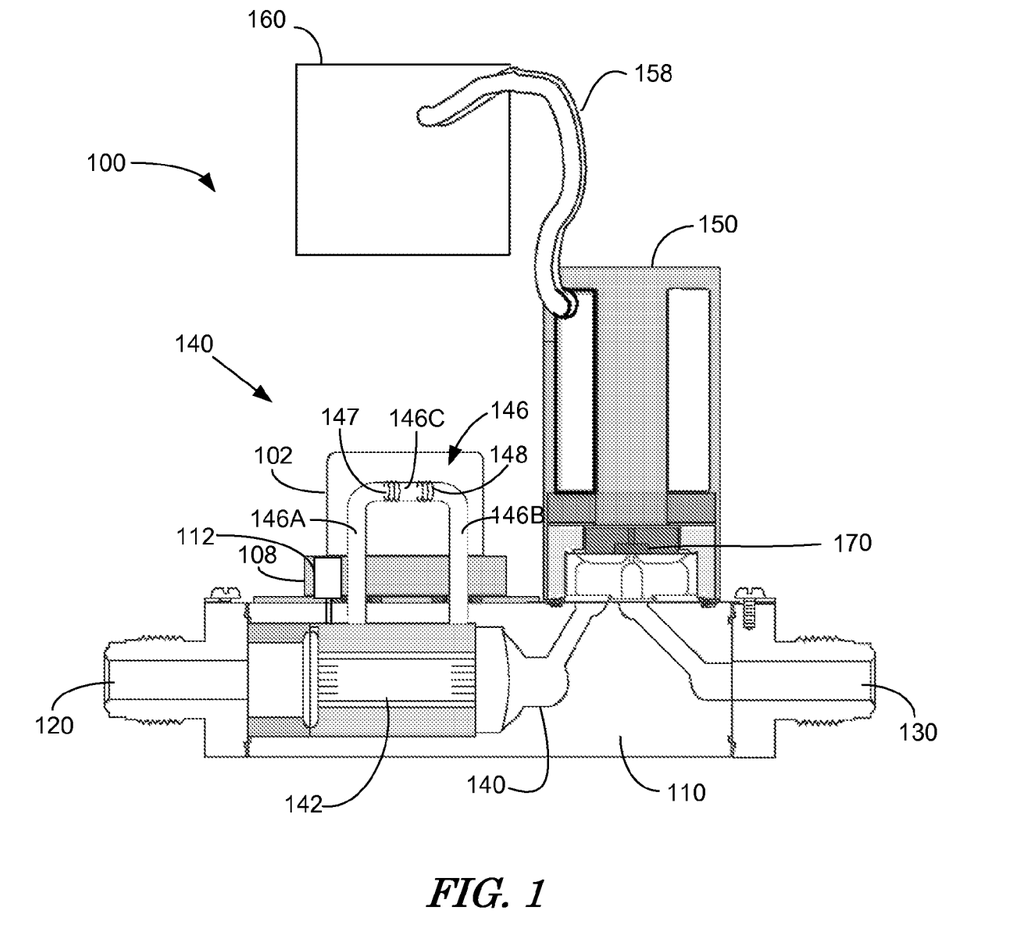
FIG. 1 illustrates a conventional thermal mass flow controller.

FIG. 1 shows schematically a typical mass flow controller 100 that includes a block 110, which is the platform on which the components of the MFC are mounted. A thermal mass flow meter 140 and a valve assembly 150 containing a valve 170 are mounted on the block 110 between a fluid inlet 120 and a fluid outlet 130. The thermal mass flow meter 140 includes a bypass 142 through which typically a majority of fluid flows and a thermal flow sensor 146 through which a smaller portion of the fluid flows.

Thermal flow sensor 146 is contained within a sensor housing 102 (portion shown removed to show sensor 146) mounted on a mounting plate or base 108. Sensor 146 is a small diameter tube, typically referred to as a capillary tube, with a sensor inlet portion 146A, a sensor outlet portion 146B, and a sensor measuring portion 146C about which two resistive coils or windings 147, 148 are disposed. In operation, electrical current is provided to the two resistive windings 147, 148, which are in thermal contact with the sensor measuring portion 146C. The current in the resistive windings 147, 148 heats the fluid flowing in measuring portion 146 to a temperature above that of the fluid flowing through the bypass 142. The resistance of windings 147, 148 varies with temperature. As fluid flows through the sensor conduit, heat is carried from the upstream resistor 147 toward the downstream resistor 148, with the temperature difference being proportional to the mass flow rate through the sensor.

An electrical signal related to the fluid flow through the sensor is derived from the two resistive windings 147,148. The electrical signal may be derived in a number of different ways, such as from the difference in the resistance of the resistive windings or from a difference in the amount of energy provided to each resistive winding to maintain each winding at a particular temperature. Examples of various ways in which an electrical signal correlating to the flow rate of a fluid in a thermal mass flow meter may be determined are described, for example, in commonly owned U.S. Pat. No. 6,845,659, which is hereby incorporated by reference. The electrical signals derived from the resistive windings 147,148 after signal processing comprise a sensor output signal.

The sensor output signal is correlated to mass flow in the mass flow meter so that the fluid flow can be determined when the electrical signal is measured. The sensor output signal is typically first correlated to the flow in sensor 146, which is then correlated to the mass flow in the bypass 142, so that the total flow through the flow meter can be determined and the control valve 170 can be controlled accordingly. The correlation between the sensor output signal and the fluid flow is complex and depends on a number of operating conditions including fluid species, flow rate, inlet and/or outlet pressure, temperature, etc.

The process of correlating raw sensor output to fluid flow entails tuning and/or calibrating the mass flow controller and is an expensive, labor intensive procedure, often requiring one or more skilled operators and specialized equipment. For example, the mass flow sensor may be tuned by running known amounts of a known fluid through the sensor portion and adjusting certain signal processing parameters to provide a response that accurately represents fluid flow. For example, the output may be normalized, so that a specified voltage range, such as 0 V to 5 V of the sensor output, corresponds to a flow rate range from zero to the top of the range for the sensor. The output may also be linearized, so that a change in the sensor output corresponds linearly to a change in flow rate. For example, doubling of the fluid output will cause a doubling of the electrical output if the output is linearized. The dynamic response of the sensor is determined, that is, inaccurate effects of change in pressure or flow rate that occur when the flow or pressure changes are determined so that such effects can be compensated.

A bypass may then be mounted to the sensor, and the bypass is tuned with the known fluid to determine an appropriate relationship between fluid flowing in the mass flow sensor and the fluid flowing in the bypass at various known flow rates, so that the total flow through the flow meter can be determined from the sensor output signal. In some mass flow controllers, no bypass is used, and the entire flow passes through the sensor. The mass flow sensor portion and bypass may then be mated to the control valve and control electronics portions and then tuned again, under known conditions. The responses of the control electronics and the control valve are then characterized so that the overall response of the system to a change in set point or input pressure is known, and the response can be used to control the system to provide the desired response.

When the type of fluid used by an end-user differs from that used in tuning and/or calibration, or when the operating conditions, such as inlet and outlet pressure, temperature, range of flow rates, etc., used by the end-user differ from that used in tuning and/or calibration, the operation of the mass flow controller is generally degraded. For this reason, the flow meter can be tuned or calibrated using additional fluids (termed "surrogate fluids") and or operating conditions, with any changes necessary to provide a satisfactory response being stored in a lookup table. U.S. Pat. No. 7,272,512 to Wang et al., for "Flow Sensor Signal Conversion," which is owned by the assignee of the present invention and which is hereby incorporated by reference, describes a system in which the characteristics of different gases are used to adjust the response, rather than requiring a surrogate fluid to calibrate the device for each different process fluid used.

Control electronics 160 control the position of the control valve 170 in accordance with a set point indicating the desired mass flow rate, and an electrical flow signal from the mass flow sensor indicative of the actual mass flow rate of the fluid flowing in the sensor conduit. Traditional feedback control methods such as proportional control, integral control, proportional-integral (PI) control, derivative control, proportional-derivative (PD) control, integral-derivative (ID) control, and proportional-integral-derivative (PID) control are then used to control the flow of fluid in the mass flow controller. A control signal (e.g., a control valve drive signal) is generated based upon an error signal that is the difference between a set point signal indicative of the desired mass flow rate of the fluid and a feedback signal that is related to the actual mass flow rate sensed by the mass flow sensor. The control valve is positioned in the main fluid flow path (typically downstream of the bypass and mass flow sensor) and can be controlled (e.g., opened or closed) to vary the mass flow rate of fluid flowing through the main fluid flow path, the control being provided by the mass flow controller.

In the illustrated example, the flow rate is supplied by electrical conductors 158 to a closed loop system controller 160 as a voltage signal. The signal is amplified, processed and supplied to the control valve assembly 150 to modify the flow. To this end, the controller 160 compares the signal from the mass flow sensor 140 to predetermined values and adjusts the proportional valve 170 accordingly to achieve the desired flow.

Figure 2:
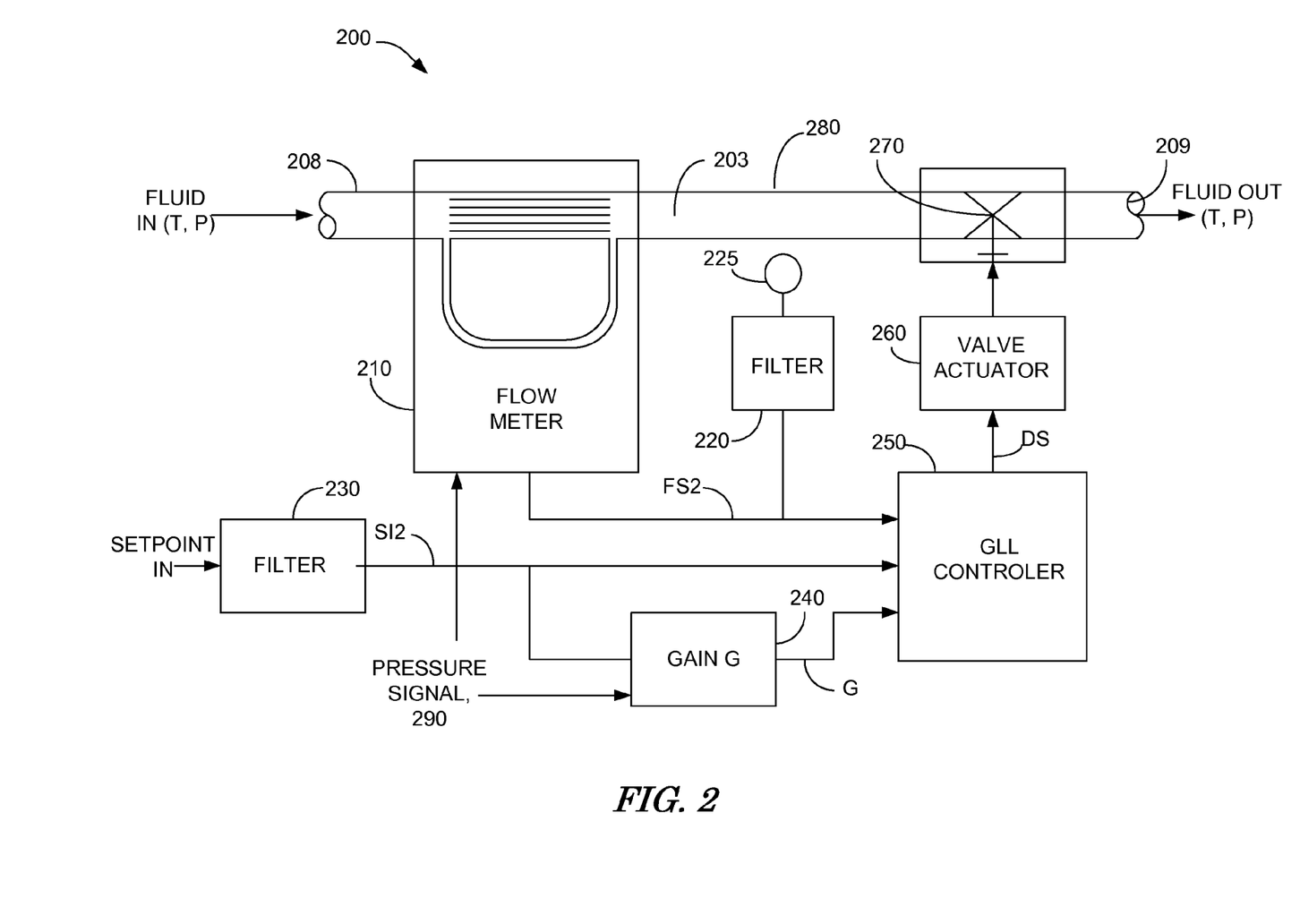
FIG. 2 illustrates a schematic block diagram of a mass flow.

FIG. 2 illustrates a schematic block diagram of a typical mass flow controller 200. The mass flow controller illustrated in FIG. 2 includes a flow meter 210, a Gain/Lead/Lag (GLL) controller 250, a valve actuator 260, and a valve 270.

The flow meter 210 is coupled to a flow path 203. The flow meter 210 senses the flow rate of a fluid in the flow path, or in a portion of the flow path, and provides a raw flow signal indicative of the sensed flow rate. The raw flow signal is typically conditioned, that is, it is normalized, linearized, and compensated for dynamic response. A conditioned flow signal FS2 is provided to a first input of GLL controller 250. The conditioned flow signal FS2 is also provided to a signal filter 220, which provides appropriate signal levels as input to a display 225, which displays the flow rate to an operator.

In addition, GLL controller 250 includes a second input to receive a set point signal SI2. A set point refers to an indication of the desired fluid flow to be provided by the mass flow controller 200. The set point signal SI2 may first be passed through a slew rate limiter or filter 230 prior to being provided to the GLL controller 250. Filter 230 serves to limit instantaneous changes in the set point in signal SI2 from being provided directly to the GLL controller 250, such that changes in the flow take place over a specified period of time. It should be appreciated that the limiter or filter 230 may be omitted, and that any of a variety of signals capable of providing indication of the desired fluid flow is considered a suitable set point signal. The term set point, without reference to a particular signal, describes a value that represents a desired fluid flow.

Each of the components of MFC 200 has an associated gain, which gains can be combined to determine a system gain. In block 240, a reciprocal gain term G is formed by taking the reciprocal of a system gain term and applying it as one of the inputs to the GLL controller. It should be appreciated that the reciprocal gain term may be the reciprocal of all or fewer than all of the gain terms associated with the various components around the control loop of the mass flow controller. For example, improvements in control and stability may be achieved by forming the reciprocal of the product of the individual component gain terms. However, in preferred embodiments, gain term G is formed such that the loop gain remains a constant (i.e., gain G is the reciprocal of the system gain term).

Pressure sensed at the inlet 208 or elsewhere provides a pressure signal 290 to flow meter 210 to compensate for spurious indications due to pressure transients. Further, the pressure signal may be used by GLL controller 250 for feed forward control of the valve. Also, the pressure signal may be used to adjust the gain in a GLL controller.

Based in part on the flow signal and the set point signal SI2, the GLL controller 250 provides a drive signal DS to the valve actuator 260 that controls the valve 270. The valve 270 is typically positioned downstream from the flow meter 210 and permits a certain mass flow rate depending, at least in part, upon the displacement of a controlled portion of the valve 270. The controlled portion of the valve 270 may be a moveable plunger placed across a cross-section of the flow path 203. The valve 270 controls the flow rate in the fluid path by increasing or decreasing the area of an opening in the cross section where fluid is permitted to flow. Typically, mass flow rate is controlled by mechanically displacing the controlled portion of the valve by a desired amount. The term displacement is used generally to describe the variable of a valve on which mass flow rate is, at least in part, dependent. As such, the area of the opening in the cross section is related to the displacement of the controlled portion, referred to generally as valve displacement.

The displacement of the valve is often controlled by a valve actuator, such as a solenoid actuator, a piezoelectric actuator, a stepper actuator etc. In FIG. 2, valve actuator 260 is a solenoid type actuator; however, the present invention is not so limited, as other alternative types of valve actuators may be used. The valve actuator 260 receives drive signal DS from the controller and converts the signal DS into a mechanical displacement of the controlled portion of the valve. Ideally, valve displacement is purely a function of the drive signal. However, in practice, there may be other variables that affect the position of the controlled portion of the valve.

When the input pressure changes, for a brief period of time the sensor output does not accurately indicate the mass flow. To mitigate this effect, some mass flow controllers include a pressure transducer. Pressure transducers allow tuning of the dynamic response of the device as a function of pressure, which in turn can provide a faster response, especially at low inlet pressures. For example, U.S. Pat. No. 7,273,063 to Lull et al., which is commonly owned with the present application and which is hereby incorporated by reference, uses signals from a pressure transducer to modify the sensor signal to compensate for some pressure related transient effects and provides some compensation for changes in the amount of gas in the inventory volume.

There is some unavoidable internal volume between the flow meter and the control valve. That volume, referred to as an "inventory volume," (e.g. 140 of FIG. 1, and 280 of FIG. 2) contains a small amount of gas that varies with pressure and temperature. An inventory volume exists between the flow meter and any downstream restriction, with the control valve being an example of a restriction. As the input pressure to the flow meter changes, a certain net amount of fluid flows into or out of the inventory volume to equalize the inventory volume pressure with that of the rest of the system, thus changing the amount, that is the mass, of fluid stored in that inventory volume. When input or output pressure changes, there is a net flow into or out of the inventory volume, and this leads to a discrepancy between the flow through the flow meter and the flow actually delivered to the process. U.S. Pat. No. 7,273,063 compensates for this by simply differentiating the inlet pressure and subsequently applying a filter, for example, to generate a transient compensating signal that nominally matches that spike for the signal inside the flow meter. The transient compensating signal is subtracted from the signal from the flow meter to compensate for the pressure change. The technique of U.S. Pat. No. 7,273,063 provides accurate sensor output for some gases, but does not provide sufficiently accurate signals for other gases.

While the presence of the inventory volume is known and attempts have been made to compensate for the volume to properly indicate flow, present methods are insufficiently accurate for the increasingly demanding standards of industry.

SUMMARY OF THE INVENTION

An object of the invention is to provide improved accuracy in flow sensors and flow controllers.

The present invention provides a more accurate indication of gas flow through a flow controller by accounting for the compressibility of the gas when correcting a flow signal for inaccuracies caused by changes in pressure.

The foregoing has outlined rather broadly the features and technical advantages of the present invention in order that the detailed description of the invention that follows may be better understood. Additional features and advantages of the invention will be described hereinafter. It should be appreciated by those skilled in the art that the conception and specific embodiment disclosed may be readily utilized as a basis for modifying or designing other structures for carrying out the same purposes of the present invention. For example, both pressure and temperature are required for calculations of the preferred embodiments. The pressure measurement used can be obtained, for instance, directly from inlet pressure, from a transducer exposed directly to the inventory volume, or approximated. Similarly, the temperature measurement used can be obtained, for instance, from the flow sensor body temperature or average gas temperature in the inventory volume. It should also be realized by those skilled in the art that such equivalent constructions do not depart from the spirit and scope of the invention as set forth in the appended claims.

BRIEF DESCRIPTION OF THE DRAWINGS

For a more through understanding of the present invention, and advantages thereof, reference is now made to the following descriptions taken in conjunction with the accompanying drawings, in which.

DETAILED DESCRIPTION OF PREFERRED EMBODIMENTS

While the mass flow controller described in U.S. Pat. No. 7,273,063 adequately compensates the sensor readings for pressure transients for some applications, it suffers from three significant shortcoming:

1. It does not adequately account for gas compressibility;
2. It does not adequately deal with nonlinearities in the flow meter; and
3. It does not adequately compensate for changes in flow meter dynamic response on different gasses or at different flow rates.

When the input pressure to an MFC changes the flow meter provides an inaccurate flow signal that does not correspond to the actual flow of gas through the valve and to the process tool. A portion of the inaccurate signal corresponds to the actual amount of gas that flows into or out of the inventory volume; another portion of the inaccurate signal is caused by the dynamic response of the flow meter to the transient changes in the gas flow through the meter as the pressure changes. Thus, an accurate correction not only compensates for the gas flowing into or out of the inventory volume, but also for the inaccuracy of the flow sensor signal caused by the unsettled thermal environment in the flow sensor caused by the change in flow. While the actual flow into or out of inventory volume is thought to occur relatively quickly, on the order of a millisecond, the portion of the inaccurate signal caused by the dynamic response of the meter is thought to last longer, on the order of a second, which, if not corrected, can lead to a significant distortion of the measured flow.

Preferred embodiments correct for this transient response to changes in pressure causing net flow into or out of the inventory volume, so that a more accurate flow is reported to the control system of a mass flow controller to adjust the valve position and is reported to the process tool operator. Preferred embodiments of the present invention compensate for the inventory space by properly accounting for gas compressibility, non-linearities in the flow meter, and changes in flow meter dynamic response on different gasses and at different flow rates.

Embodiments of the invention substantially improve flow measurement accuracy, particularly on non-ideal gases, such as $SF_6$, and on highly non-linear flow meters, by substantially improving pressure-transient performance compared to prior art mass flow controllers. Accounting for the compressibility significantly improves the measurement accuracy for gases that do not follow the ideal gas law (PV=nRT).

Figure 3:
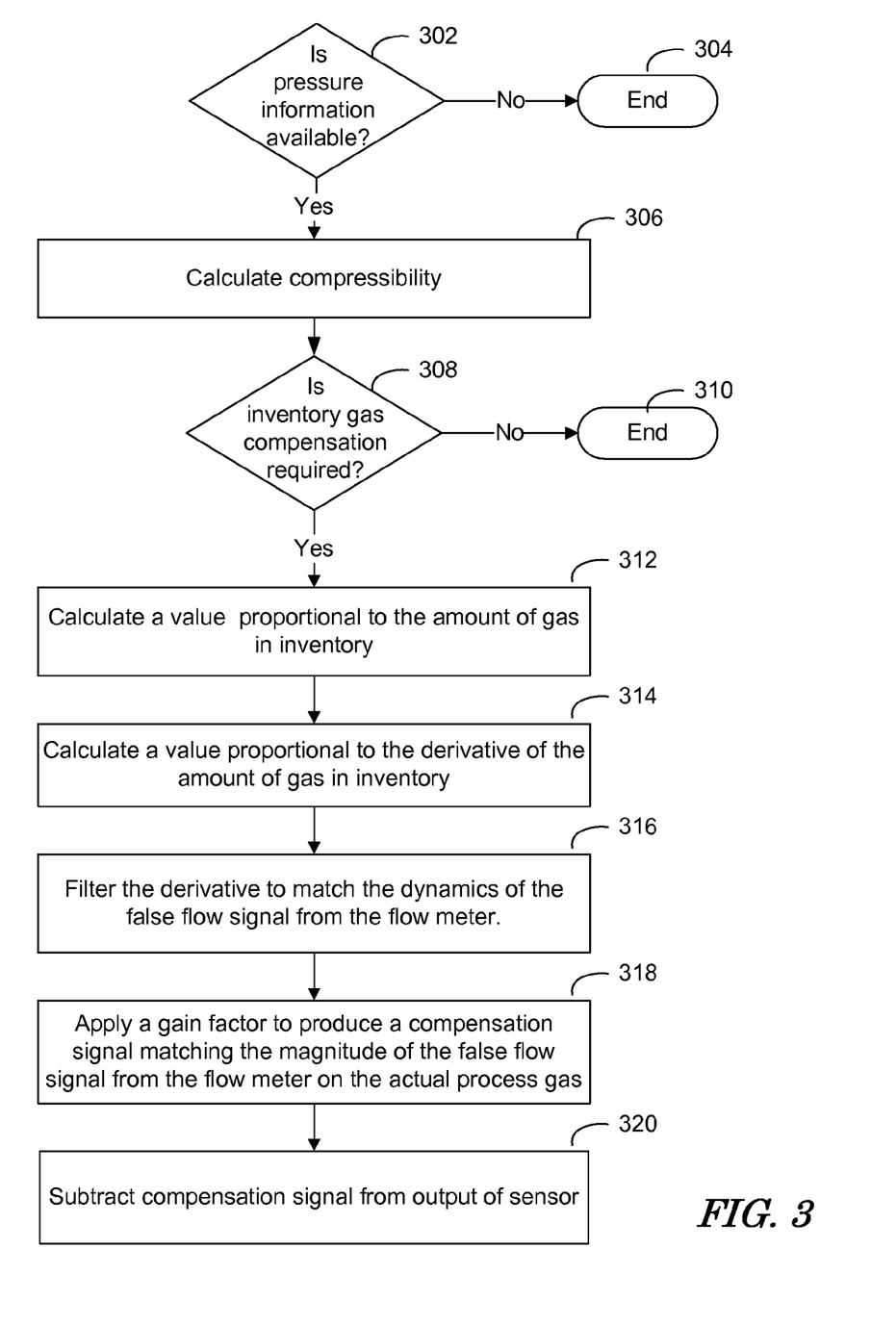
FIG. 3 is a flow chart showing one preferred method of the present invention.

FIG. 3 shows an overview of the steps of a preferred embodiment of the present invention. Several of the steps are explained later in more detail. In step 302, the system verifies that pressure information is available. If no pressure information is available, for example, because the pressure transducer is not providing a pressure signal input to the flow meter, then pressure effects on gas in the inventory volume cannot be calculated and the process ends at block 304. The cause of the lack of pressure information is preferably investigated by an operator and corrected before the process restarts.

If pressure information is available, the compressibility of the fluid is determined in step 306. The compressibility depends on the gas species and the pressure and the temperature of the gas. In step 308, the system determines whether it is in an operating state in which inventory gas compensation is required. For example, if the operator sets the valve to stop the gas flow, then the gas flow rate through the valve is known to be zero, and so no adjustment to the sensor output is required to indicate an accurate flow rate. If no inventory gas compensation is required, the process stops in step 310.

If inventory gas compensation is required, the process continues in step 312, in which a value related to gas-in-inventory is calculated. As described above, there is a difference between the flow indicated by the flow sensor and the actual flow through the valve if, after passing through the flow sensor, there is a net gain or loss of gas in the inventory volume. Thus, the inventory volume compensation depends not on the actual amount of gas in the inventory volume itself, but on the change of the amount of gas in the inventory volume. If the amount of gas in the inventory volume remained constant, then no compensation for the inventory volume would be required. It is therefore not necessary to actually calculate the exact amount of gas in the inventory volume, it is only necessary to determine the change in the amount of gas. The change can be determined from a value related to the amount gas in the inventory volume, without calculating the actual amount of the gas in the inventory volume. For example, an inventory value that is proportional to the inventory amount can be calculated.

In step 314, a value proportional to the derivative with respect to time of gas-in-inventory is calculated from the inventory values determined in step 312.

In step 316, the value proportional to the derivative determined in step 314 is applied to a signal filter to produce a signal corresponding to the inaccurate flow signal produced by the flow sensor in response to an input pressure change. Because the input to the filter is the value related to the time related change of gas amount in the inventory volume determined in step 314, the signal produced by the filter will depend on the variables used to produce the derivative, that is, the compressibility of the gas, the change in pressure, and the temperature of the gas. Thus, the signal from the filter can more accurately reflect the actual operating conditions of the flow meter.

In step 318, a gain factor, specific for the process gas being used in the MFC, is applied to the signal calculated in step 316 to produce a compensation signal that matches the magnitude of the inaccurate flow signal from the flow meter on the actual process gas. In step 320, the compensation signal is subtracted from the output of the sensor, which eliminates the effects of changes in inventory value from the flow signal so that the flow meter is more accurately indicating the actual fluid flow to a process tool.

Below are described in more detail several exemplary methods of carrying out some of the steps of FIG. 3. The invention is not limited to these exemplary methods. For determining the compressibility of the gas in step 306, various algorithms are known. Some calculations of compressibility are very accurate over a wide range of pressure and temperature, but are not well suited for implementation directly in the device firmware. A preferred algorithm is sufficiently accurate to provide flow information at the required accuracy, while requiring relatively little processing and little data storage. One algorithm expresses the compressibility, $Z(P,T)$, as a function of pressure and temperature using the alternate form of the well known virial expansion, which expresses the pressure of a many-particle system in equilibrium as a power series in the pressure. A suitable implementation truncates the power series at the second order term.

$$Z(P,T)=1+B'(T)*P+C'(T)*P^2 \quad \text{[Equation.1]}$$

where:

P is the absolute pressure of the gas in the inventory volume, for computational convenience P may be expressed as a fraction of the full scale range of the absolute pressure signal available to the flow meter ($P^2=P*P$ is the notation for the second order term).

B' and C' are the alternate form of the second and third virial coefficients.

T is the absolute temperature of the gas in the inventory volume, expressed in degrees Kelvin (K).

The alternate form of the 2nd & 3rd virial coefficients can each be approximated over a reasonable temperature range as cubic polynomials of 1/T:

$$B'(T) \sim B(T)=B0+B1/T+B2/T^2+B3/T^3$$

$$C'(T) \sim C(T)=C0+C1/T+C2/T^2+C3/T^3$$

Values of $Z(P,T)$ may be obtained spanning the range of operating pressures and temperatures anticipated for the flow meter. The $Z(P,T)$ values may come from measurement data or may be computed using a suitable equation of state model. One suitable model for computing $Z(P,T)$ is that of Lee and Kesler using the three-parameter principle of corresponding states of Pitzer. For a particular temperature Ti the values of $Z(P,Ti)$ at several different pressures (e.g. P1, P2, P3, ..., Pn) form a curve that may be fit by suitable mathematical process to determine B'(Ti) and C'(Ti) satisfying Equation.1 at temperature Ti over the pressure range P1-Pn. The values of B'(T) and C'(T) may be thus determined at several different temperatures (e.g. T1, T2, T3, ..., Tn). The temperature related sequence of values B'(T1), B'(T2), B'(T3), ..., B'(Tn) form a curve that may be fit by a suitable mathematical process to determine the approximation B(T). Similarly the temperature related sequence of values C'(T1), C'(T2), C'(T3), ..., C'(Tn) form a curve that may be fit by a suitable mathematical process to determine the approximation C(T). Least squares fitting is one example of a suitable mathematical process for determining B(T) and C(T) as cubic polynomials of 1/T. A preferred algorithm then uses the compressibility approximation:

$$Za(P,T)=1+(B0+B1/T+B2/T^2+B3/T^3)*P+(C0+C1/T+C2/T^2+C3/T^3)*P^2 \quad \text{[Equation.2]}$$

To determine a value related to the gas in inventory for step 312, one can first determine an expression for the actual amount gas in inventory, and then derive a simpler expression proportional to the gas in inventory, the simpler expression being used by firmware during operation of the MFC. The actual amount of gas in inventory does not need to be calculated. The gas-in-inventory can be calculated as:

$$Ig = \frac{Vi}{Z(P,T)} \cdot \frac{P}{P0} \cdot \frac{T0}{T} \quad \text{[Equation 3]}$$

where:

Ig=gas stored in the inventory volume (standard cm$^3$)
Vi=Inventory volume (cm$^3$)
P=Pressure of the gas in the inventory volume (Pa)
P0=standard pressure (Pa)
T=Temperature of the gas in the inventory volume (K)
T0=standard temperature (K); and
$Z(P,T)$=Compressibility of the process gas at pressure P and temperature T (per Equation.1 above).

As it well known, 1 standard cm$^3$=1/22414 mole

Because the process requires only an expression proportional to the gas in inventory, the constant terms Vi, P0, and T0 can therefore be omitted and the remaining expression will still represent a value, Mg, proportional to gas-in-inventory, leaving:

$$Mg=(P/(Za(P,T)*T) \quad \text{[Equation.4]}$$

where:

Za(P,T)=approximated compressibility of the process gas at pressure P and temperature T (per Equation.2 above);

While the value of Mg above is an example of a value proportional to the gas in inventory that can be used in a preferred algorithm, the invention is not limited to any particular value calculation.

In step 314, a value proportion to the change in time of the amount of gas in the inventory volume is determined. The values of Mg can be calculated repeatedly as data from the pressure and temperature sensors are updated. The values of Mg thus form a time series of discrete values, equally spaced in time by a period τ and designated . . . , $Mg_{n-1}$, $Mg_n$, $Mg_{n+1}$, . . . , the derivative of Mg with respect to time can be approximated over the interval between samples n−1 and n as simply:

$$\frac{dMg_n}{dt} = \frac{Mg_n - Mg_{n-1}}{\tau} \qquad \text{[Equation 5]}$$

Since the system requires only a value proportional to the derivative of the amount of gas in inventory over time, and not the derivative itself, and because τ is fixed for any given device, the system omits the constant τ from the calculation and uses the quantity $Mg_n - Mg_{n-1}$ as a value proportional to the derivative. The subscripts n and n−1 represent the value of the corresponding variables for the current and previous signal processing cycles, respectively.

In step 316, the value proportional to the derivative is filtered to produce a signal matching the dynamics of the inaccurate flow signal. The change in Mg in response to a step change in pressure is dictated by the acoustic propagation delay and pneumatic RC time constant of the flow meter and inventory volume. Since flow meters generally have a very low flow resistance, and the inventory volume is minimized as much as possible in the design of the MFC, the pneumatic time constant is typically very short. Since the bypass is generally physically short and relatively open, the acoustic propagation delay is short as well, typically less than a millisecond.

Flow meter response, however, is far slower. Flow meter dynamic response is dominated by multiple thermal time constants in the flow sensor itself—some of which are on the order of a second. Prior art flow meters response is typically compensated to settle in a fraction of a second, but this still leaves a significant discrepancy between the actual flow into or out of the inventory volume and the corresponding spike in indicated flow.

To more accurately indicate flow, the system of the present invention produces a compensation signal closely matching the waveform of the pressure transient induced "inaccurate flow" signal from the flow meter. The compensation signal is derived from the actual flow into or out of the inventory volume. This compensation signal could be produced through a wide variety of signal filters. While one preferred filter is described below, the invention is not limited to any particular filter, and skilled persons can readily determine other filters that can accomplish this task.

One suitable filter comprises a cascade of six, two-pole infinite impulse response, low-pass filter sections to produce a series of six "smeared out" pulses from an impulse input. These "smeared out" pulses are then scaled and summed to produce a waveform to compensate for the inaccurate sensor signal.

Each filter section implements the equation:

$$J_{m,n} = 2 \ast J_{m,n-1} - J_{m,n-2} + ((I_{m,n} - J_{m,n-1}) \ast Q_m - (J_{m,n-1} - J_{m,n-2})) \ast P_m$$

where:

$I_{m,n}$ is the input to filter section m on signal processing cycle n $J_{m,n}$ is the output of filter section m on signal processing cycle n $P_m$ and $Q_m$ are tuning parameters controlling the impulse response of filter section m. The parameters $P_m$ and $Q_m$ are determined empirically as described below.

Figure 4:
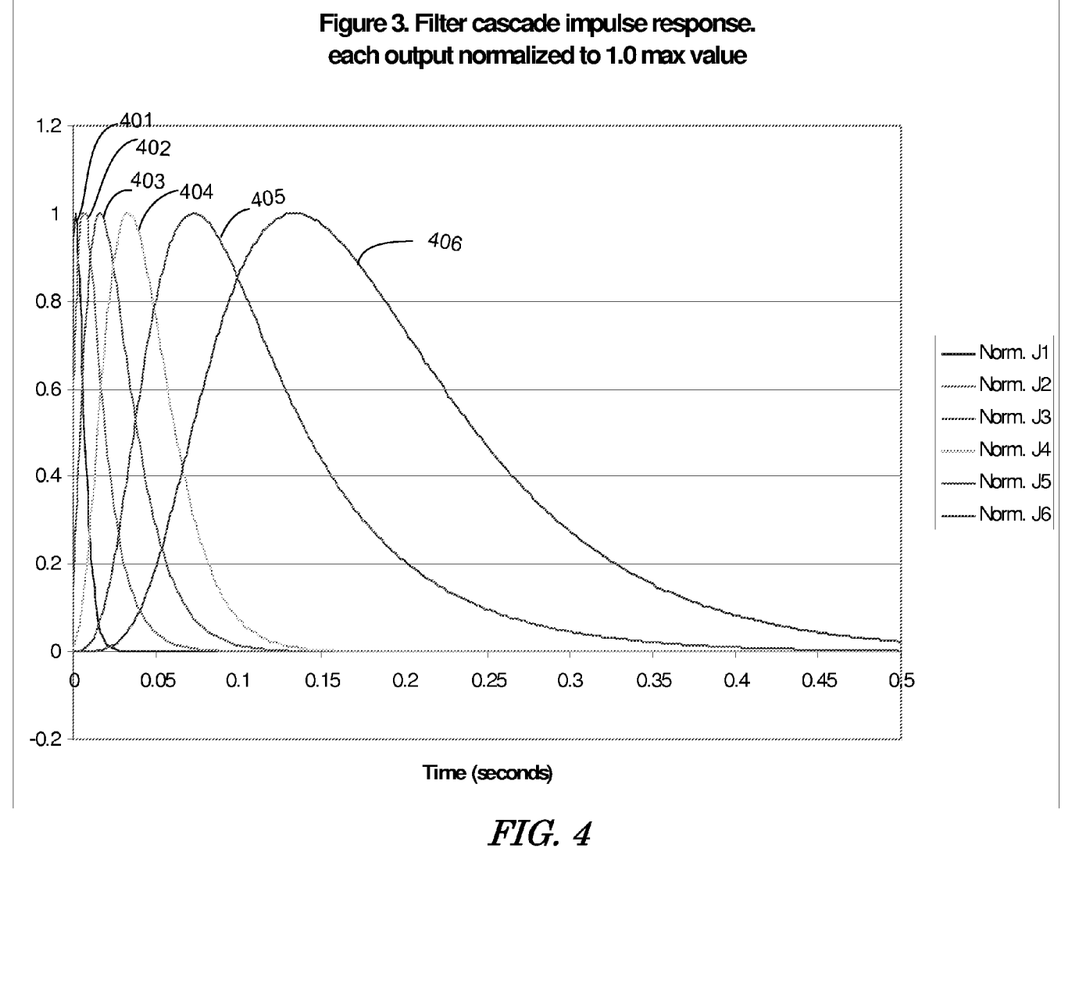
FIG. 4 is a chart illustrating normalized outputs of the stages of a preferred signal filter of the present invention.

The input, $I_{1,n}$, to the first filter section is the value related to the change in inventory volume calculated in step 312, that is, $Mg_n - Mg_{n-1}$. For the second and subsequent cascaded filter sections, the input I is the output from the previous section, that is, $I_{m,n} = J_{m-1,n}$. FIG. 4 shows the outputs of each filter section in the cascade for a unit impulse in to the cascade, for typical values of P and Q. Each output in the figure is normalized to a peak value of 1 for easy visibility. The filter described produces a waveform that closely matches the shape of the inaccurate flow signal, but at some arbitrary magnitude. This signal must then be scaled to match the actual magnitude of the inaccurate flow signal on a specific device. Lines 401-406 represent respectively, the output of the filter stages one through six.

Each of the filter section outputs is scaled by a gain factor $G_m$ and summed to get a simulated inaccurate flow signal for each time interval n for the specific process gas being used.

$$\text{Simulated False } Signal_n = \sum_{m=1}^{6} G_m \cdot J_{m,n}$$

Figure 5:
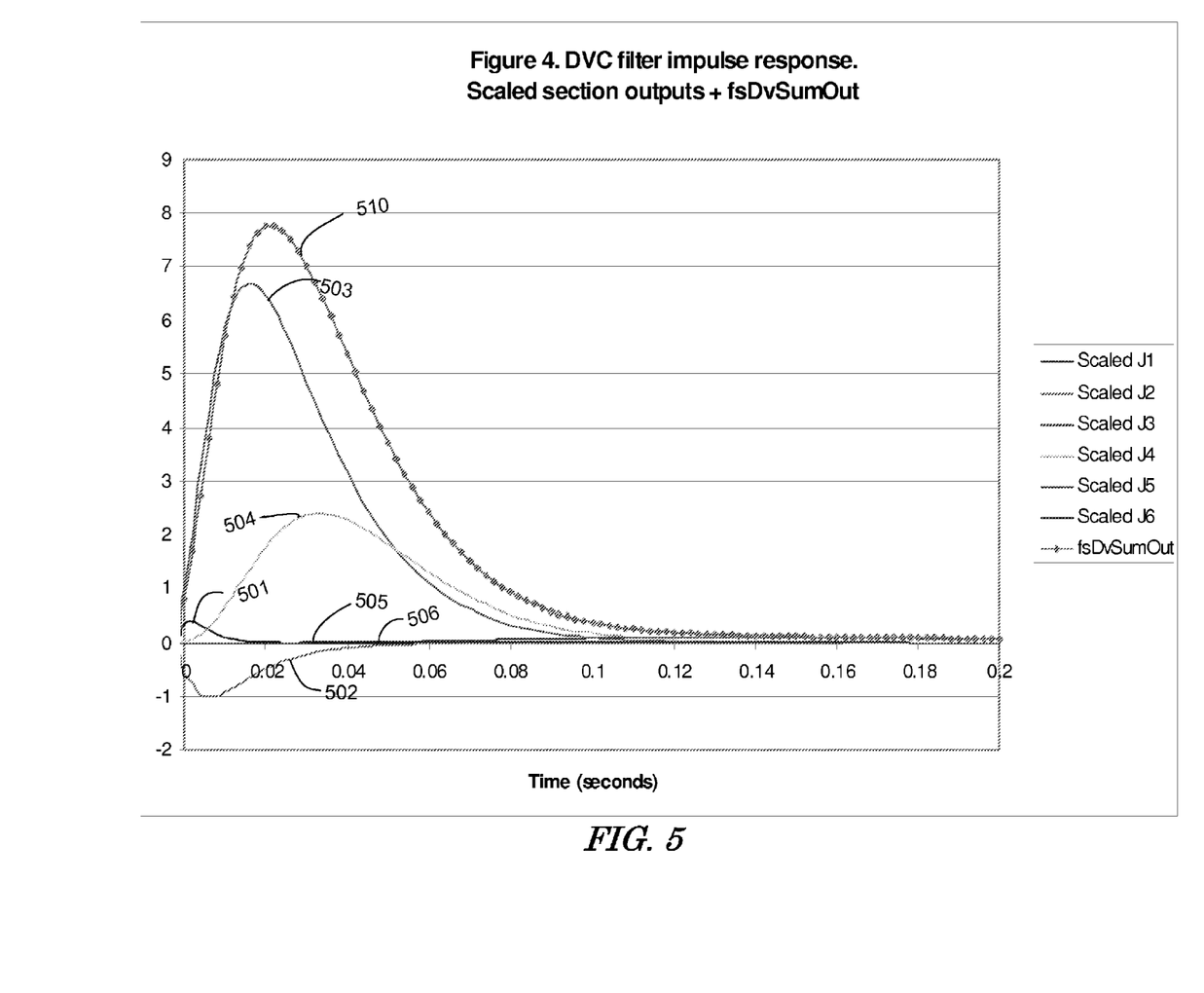
FIG. 5 is a chart illustrating the scaled filter section outputs of FIG. 4 and the resulting sum for a preferred embodiment of the present invention.
Figure 6:
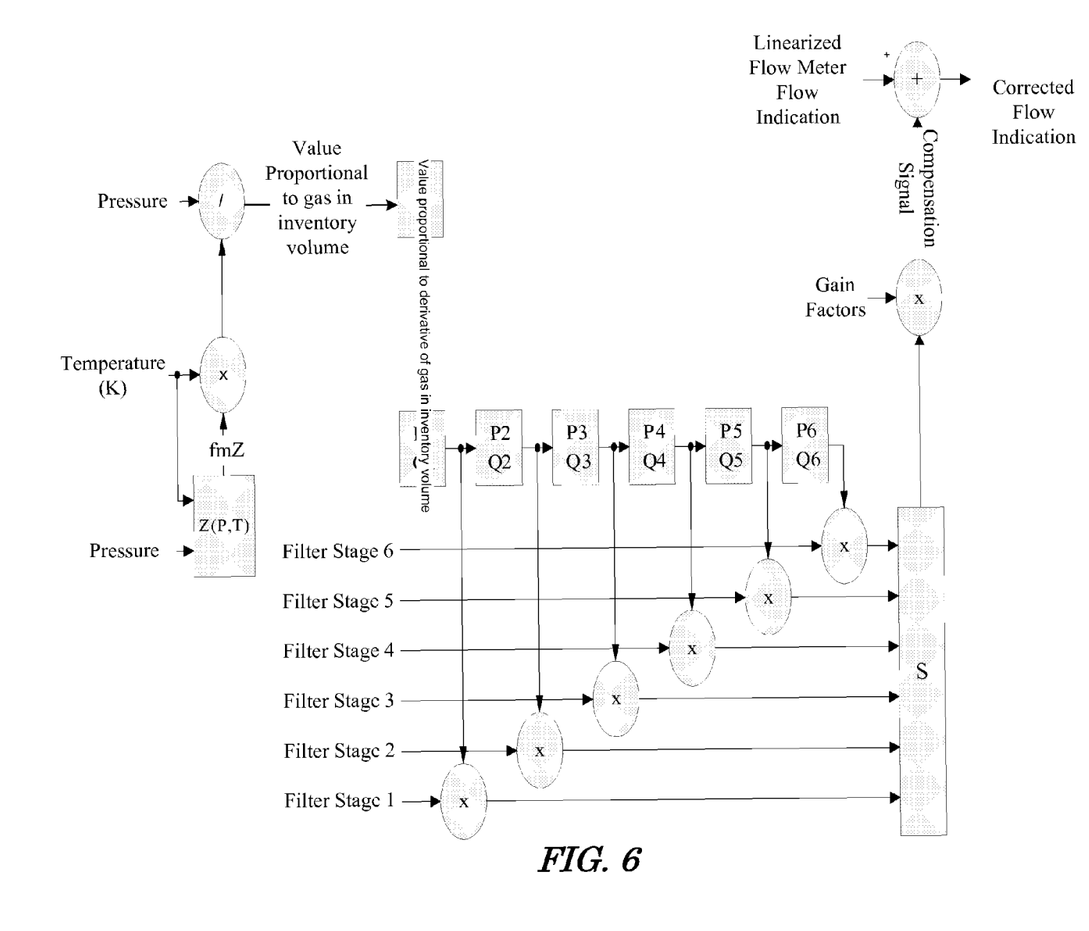
FIG. 6 illustrates an algorithm of a preferred embodiment of the present invention.

FIG. 5 shows the scaled filter section outputs (Gm*Jm,n) and the resulting sum for a typical application. Lines 501-506 represent respectively, the scaled output of the filter stages one through six.

This scaling must take into account several factors:
The inventory volume varies from device to device.
The magnitude of the filter output varies depending on the
  inventory volume and the fitting procedure used to select
  the specific set of G values to be used.
The range of the flow meter varies from device to device,
  and from process gas to process gas on a specific device.

All of the required parameters—$P_m$, $Q_m$, and $G_m$—can be determined during production of the flow meter comprised of a sensor and a bypass by a procedure that includes changing the input pressure to the flow meter by a representative amount at a representative rate and then observing the sensor electrical output and measuring the actual flow. The discrepancy between the actual measured fluid flow and the sensor output represents the "false flow." Software optimizes the filter parameters to give a waveform closely matching the shape of the measured inaccurate flow signal, and matching its amplitude expressed in sccm, or standard $cm^3$ per minute.

The P and Q values can be selected by an N-dimensional nonlinear minimizer, using for each trial G values obtained by a linear least squares fit If sensor response and response compensation are sufficiently reproducible, then nominal P, Q, and G values can be determined for a typical sensor through testing with very fast pressure transients on a few sample sensors and the average values applied across some larger population.

Note that the specific G values used are somewhat arbitrary, though their relative values are critical to the filter performance. The entire waveform may be scaled up or down, adjusting all G values by the same factor in order to match their magnitudes to that of a specific flow meter. In some embodiments, a single scale factor is applied in step 318 to the filter output, in addition to the individual scale factors applied to each filter section.

The gain factor applied in step 318 is inversely proportional to the nominal flow range of the device on a specific process gas, expressed in sccm. This proportionality constant is required because the flow rate, at the point where the compensation signal is injected, is expressed as a fraction of the nominal flow range of the device on the selected process gas. If the flow signal were expressed directly in sccm, no gain adjustment would be needed. This is because the filter input is directly proportional to the net flow rate (in sccm) into or out of the inventory volume—completely independent of gas species—so long as the compressibility calculation and measured temperature and pressure are correct.

If the filter parameters for the inventory volume compensation are determined at the factory before the sensor is calibrated, the indicated flow signal during the inventory volume compensation correction will be incorrect by an amount dependent on the flow rate, and the gain factor needs to compensate for this error. The gain factor can be determined empirically, or from the non-linearity of the sensor and the maximum net flow into or out of the inventory volume.

In other embodiments, it may be desirable to record the compensation transient data at a point where it is convenient in terms of the manufacturing process, and then convert the data to a calibrated flow signal and perform the curve fit and gain adjustment after final calibration. Skilled person can determine a gain constant based on an understanding of a particular flow sensor device and a particular production process flow.

In some embodiments, the inventory volume correction can be confined to flow rates where the flow meter is essentially linear, and then the software could scale based on the difference between the estimated low-flow slope of the calibration curve (during the compensation process) and the final low-flow slope of the calibration curve once a valid curve is determined.

Note that while the filter parameters are preferably determined at the factory and fixed for the sensor, the gain adjustment is determined during operation because it is proportional to the fluid flow.

The algorithm used for the compensation for the inventory volume is typically stored in firmware on the circuit board of the mass flow controller. Depending on the processing power available in the specific application, the inventory volume compensation filter cascade can be run at less than the full signal processing rate, with a portion of the filter being run on each processing cycle.

The algorithm described above compensates for the linearized flow signal rather than the raw sensor output. Skilled persons could readily create algorithms to operate on the raw flow signal. When correcting the linearized flow signal, either the final inventory gas compensation gain adjustment must be made after the device is calibrated for a particular gas, or the calibration process must provide a calibration to convert sensor output to determine the inventory gas compensation gain adjustment for the particular gas used. This is because the parameters used in the filter, P, Q, and G, will vary with the gas used. If the gas used in the process is different from the gas used to determine the filter parameters, then the sensor output will need to be compensated for the different gas. This can be done either by performing calibration on every unit with nitrogen and using known methods of adjusting for the process gas, or by performing a final inventory gas compensation gain adjustment as part of a calibration process using the process gas or suitable surrogate gas. The correction signal should coincide temporally with the sensor output signal being corrected. Due to relatively long time constants associated with heat diffusion in the mechanical structures of a heated capillary flow sensor there is typically some delay between detection of a change in pressure and the output of the false signal from the flow meter. The delay inherent in the signal processing, particularly in the multistage filter, may be adequate to temporally coordinate the correction signal with the sensor false signal; if not, an additional delay element may be added to the circuit.

Also, since the algorithm above is compensating the linearized flow signal, the result will be sensitive to any discrepancy between the derivative of the linearization curve and the derivative of the actual flow meter output-versus-flow curve. Such nonlinearities would most often arise at low flow rates due to uncorrected sensor offsets during final calibration, such as residual valve heating effects, potentially leading to a low-flow "hook" in the derivative of the linearization curve. Such irregularities can degrade accuracy of the inventory gas compensation algorithm, and should be avoided in most embodiments.

Because temperature changes relatively slowly, calculation of temperature dependent virial coefficients can be scheduled at the convenience of the firmware. They are preferably updated at least 10 times per second, but updating them more often than the temperature is updated is not useful. Calculation of flow compensation is preferably performed as part of normal flow meter processing on every signal processing cycle, and should occur as soon as the linearized flow rate becomes available.

All other firmware calculations defined above, such as the compressibility, the value corresponding to the inventory value, the value corresponding to the amount of gas in the inventory volume, the value corresponding to the derivative of the amount of gas in the inventory volume, and the compensation signal are preferably preformed on every signal processing cycle. These calculations can begin as soon as the normalized flow rate calculation is available, and are preferably completed before the drive signal to the valve actuator is produced.

Although the present invention and its advantages have been described in detail, it should be understood that various changes, substitutions and alterations can be made herein without departing from the spirit and scope of the invention as defined by the appended claims. For example, while the embodiment described above compensates for input pressure transients, skilled persons can recognize that embodiments could also compensate for changes in output pressure in the case of devices wherein the flow meter is not substantially isolated from the output pressure by action of the control valve (e.g. in a reverse flow device having the control valve upstream of the flow meter). Moreover, the scope of the present application is not intended to be limited to the particular embodiments of the process, machine, manufacture, composition of matter, means, methods and steps described in the specification. For example, both pressure and temperature are required for calculations of the preferred embodiments. The pressure measurement used can be obtained, for instance, directly from inlet pressure, from a transducer exposed directly to the inventory volume, or approximated. Similarly, the temperature measurement used can be obtained, for instance, from the flow sensor body temperature or average gas temperature in the inventory volume. The invention is not limited to any particular means for generating an electrical signal corresponding to the flow. While an embodiment using two resistive coils is described, other embodiments can use three or any number of resistive coils, or other temperature sensitive elements, such as thermocouples or thin film resistors. Also, the invention is not limited to mass flow meters, but could be applied to other types of flow meters, such as volume flow meters.

While the inventory volume was described in the embodiment above as comprising the volume between the flow sensor and the adjustable valve, the inventory volume could comprise any volume between the flow sensor and a flow restriction, such as an orifice. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

I claim:

1. A mass flow controller for measuring flow of a fluid, comprising:
   a flow meter for providing a signal corresponding to mass flow through the flow meter, the flow meter including a flow sensor;
   an adjustable valve for controlling the passage of fluid out of the mass flow controller;
   a fluid path through the mass flow controller, the fluid path including an inventory volume between the flow sensor and the adjustable valve;
   a pressure transducer for providing a signal corresponding to the fluid pressure at a position in the flow path before the adjustable valve; and
   a signal processor to determine the compressibility of the gas in the fluid path using the fluid temperature and pressure and to correct the signal from the flow sensor for inaccuracies caused by a change in pressure, the correction depending on the compressibility of the gas; and
   a controller to adjust the adjustable valve to control the flow through the mass flow controller in accordance with the corrected signal corresponding to the fluid flow.

2. The mass flow controller of claim 1 in which the signal processor is programmed to calculate compressibility using a form of the virial coefficients.

3. The mass flow controller of claim 1 in which the signal processor is programmed to determine a signal that compensates for the change in pressure using a value proportional to the change in gas in the inventory volume.

4. The mass flow controller of claim 3 in which value proportional to the change in gas in the inventory volume includes a pressure term, a compressibility term, and a temperature term.

5. The mass flow controller of claim 3 in which value proportional to the change in gas in the inventory volume is proportional to the pressure and inversely proportional to the temperature and compressibility of the gas.

6. The mass flow controller of claim 1 in which the signal processor is positioned on the flow meter.

7. The mass flow controller of claim 1 in which the signal processor is part of the controller.

8. The mass flow controller of claim 1 further comprising a temperature sensor.

9. A method of determining fluid flow through a mass flow controller including a flow sensor, comprising:
   measuring pressure in a fluid path;
   measuring temperature in the fluid path;
   determining compressibility of the gas using the pressure and temperature measurement; and
   modifying, using the determined compressibility of the gas, a signal from the flow sensor to correct for changes in pressure.

10. The method of claim 9 in which modifying a signal from the flow sensor includes modifying a signal derived from one or more temperature sensitive elements.

11. The method of claim 10 in which the one or more temperature sensitive elements comprise heated resistive winding positioned along a tube through which the fluid being measured flows.

12. The method of claim 10 in which the one or more temperature sensitive elements comprise a thermocouple or a thin film resistor.

13. The method of claim 9 in which modifying a signal from the flow sensor includes modifying a signal derived from applying heat in the flow path and sensing temperature at one or more points in the flow path, the temperatures being determined in part by the gas flow.

14. The method of claim 13 in which applying heat in the flow path includes applying by one or more resistive windings and in which sensing temperature at one or more points in the flow path includes sending temperature using resistive windings, a thermocouple, or a thin film resistor.

15. The method of claim 9 in which modifying, using the determined compressibility of the gas, a signal from the flow sensor to correct for changes in pressure includes modifying the signal using a change in the amount of gas in an inventory volume.

16. The method of claim 10 in which modifying the signal using a change in the amount of gas in an inventory volume includes using the change in the amount of gas in inventory as the input of a filter.

17. The method of claim 16 in which modifying the signal using a change in the amount of gas in an inventory volume includes using the change in the amount of gas in inventory as the input of a series of cascading filters.

18. The method of claim 17 in which modifying the signal using a change in the amount of gas in an inventory volume includes using the change in the amount of gas in inventory as the input of a series of cascading second order filters.

19. The method of claim 9 in which modifying a signal from the flow sensor to correct for changes in pressure includes modifying a signal that has been normalized and calibrated to a particular gas.

20. A method of determining gas flow through a mass flow controller including a flow sensor, comprising:
   measuring pressure in a fluid path;
   measuring temperature in the fluid path;
   determining compressibility of the gas using the pressure and temperature measurement; and
   generating a sensor output signal derived from two resistors in a flow sensor;
   modifying the sensor output signal to produce a corrected sensor output signal, the corrected sensor output signal being normalized, linearized with respect to the sensor fluid flow, and corrected for changes in pressure using the compressibility of the gas.

21. The method of claim 20 further comprising controlling a gas flow valve in accordance with the corrected sensor output.

22. The method of claim 20 in which modifying the sensor output signal to produce a corrected sensor output signal includes calibrating and linearizing the sensor output before correcting the sensor output for changes in pressure.

23. The method of claim 20 in which determining compressibility of the gas using the pressure and temperature measurement includes using a form of a virial expansion.

24. The method of claim 20 in which modifying the sensor output signal to produce a corrected sensor output signal includes determining a change in the amount of gas in the inventory volume.

25. The method of claim 24 in which modifying the sensor output signal to produce a corrected sensor output signal includes using the change in the amount of inventory volume as an input to an electronic filter.

26. The method of claim 24 in which the filter produces a false flow signal that is subtracted to produce the corrected sensor output signal.

27. A method of controlling a valve, comprising:
receiving a set point corresponding to a desired flow rate of fluid through the valve;
determining a valve drive signal to be provided to the valve that corresponds to the desired flow rate, the valve drive signal corresponding to a first displacement of the valve under a first set of pressure conditions in a flow path leading to the valve;
measuring at least one pressure in a flow path that corresponds to a second set of pressure conditions that is different than the first set of pressure conditions;
determining the compressibility of the fluid as a function of temperature and pressure measured in the flowpath; and
modifying the valve drive signal to compensate for a difference in a displacement of the valve due to a difference between the first set of pressure conditions and the second set of pressure conditions.

28. The method of claim 27 in which determining the compressibility of the fluid as a function of temperature and pressure measured in the flow path includes determining compressibility using a form of the virial coefficients.

29. The method of claim 27 in which modifying the valve drive signal includes modifying the drive signal by an amount determined by the change in gas in the inventory volume.

30. The method of claim 29 in which modifying the drive signal by an amount determined by the change in gas in the inventory volume includes modifying the drive signal by an amount determined by value proportional to the change in gas in the inventory volume.

31. The method of claim 29 in which modifying the drive signal by an amount determined by the change in gas in the inventory volume includes modifying the drive signal by an amount determined by a value proportional to the pressure and inversely proportional to the temperature and compressibility of the gas.

32. A mass flow meter, comprising:
a fluid path for passage of a fluid;
a flow sensor through which a fluid flows, the flow sensor connected to the fluid path, the flow sensor producing an electrical signal corresponding to the flow of fluid through the flow sensor;
a flow restriction in the fluid path, the volume of the fluid path between the flow sensor and the restriction defining an inventory volume;
a pressure transducer for providing a signal corresponding to the fluid pressure at a position in the flow path before the flow restriction; and
a signal processor programmed to determine the compressibility of the gas in the fluid path using the fluid temperature and pressure and to correct the electrical signal from the flow sensor for inaccuracies caused by a change in pressure, the correction depending on the compressibility of the gas.

33. The mass flow meter of claim 32 in which the signal processor is programmed to calculate compressibility using a form of the virial coefficients.

34. The mass flow meter of claim 32 in which the signal processor is programmed to determine a signal that compensates for the change in pressure using a value proportional to the change in gas in the inventory volume.

35. The mass flow meter of claim 34 in which value proportional to the change in gas in the inventory volume includes a pressure term and a compressibility term.

36. The mass flow meter of claim 34 in which value proportional to the change in gas in the inventory volume is proportional to the pressure and inversely proportional to the temperature and compressibility of the gas.

37. A mass flow controller for measuring flow of a fluid, comprising:
a fluid inlet;
a flow meter connected to the fluid inlet for providing a signal corresponding to mass flow through the flow meter, the flow meter including a flow sensor;
an adjustable valve for controlling the passage of fluid out of the mass flow controller through a fluid outlet;
a fluid path through the mass flow controller from the fluid inlet to the fluid outlet, the fluid path including an inventory volume between the flow sensor and the adjustable valve;
a pressure transducer for providing a signal corresponding to the fluid pressure at a position in the flow path before the adjustable valve; and
a signal processor to determine the compressibility of the gas in the fluid path using the fluid temperature and pressure and to correct the signal from the flow sensor for inaccuracies caused by a change in pressure, the correction depending on the compressibility of the gas; and
a controller to adjust the adjustable valve to control the flow through the mass flow controller in accordance with the corrected signal corresponding to the fluid flow.

38. A mass flow controller for measuring flow of a fluid, comprising:
a fluid inlet;
an adjustable valve connected to the fluid inlet for controlling the passage of fluid through the mass flow controller;
a flow meter connected to a fluid outlet for providing a signal corresponding to mass flow through the flow meter, the flow meter including a flow sensor;
a fluid path through the mass flow controller from the fluid inlet to the fluid outlet, the fluid path including an inventory volume between the adjustable valve and the flow sensor;
a pressure transducer for providing a signal corresponding to the fluid pressure at a position in the flow path after the adjustable valve;
a signal processor to determine the compressibility of the gas in the fluid path using the fluid temperature and pressure and to correct the signal from the flow sensor for inaccuracies caused by a change in pressure, the correction depending on the compressibility of the gas; and
a controller to adjust the adjustable valve to control the flow through the mass flow controller in accordance with the corrected signal corresponding to the fluid flow.

* * * * *